Aug. 3, 1943.   W. R. GERRY   2,325,671
CONTROL MECHANISM
Filed Nov. 18, 1941
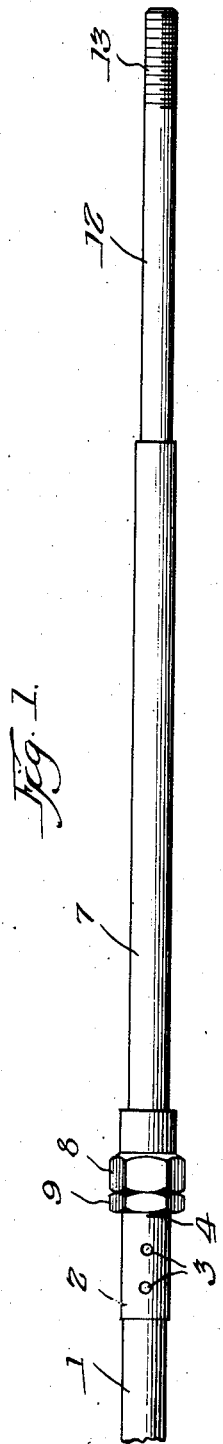
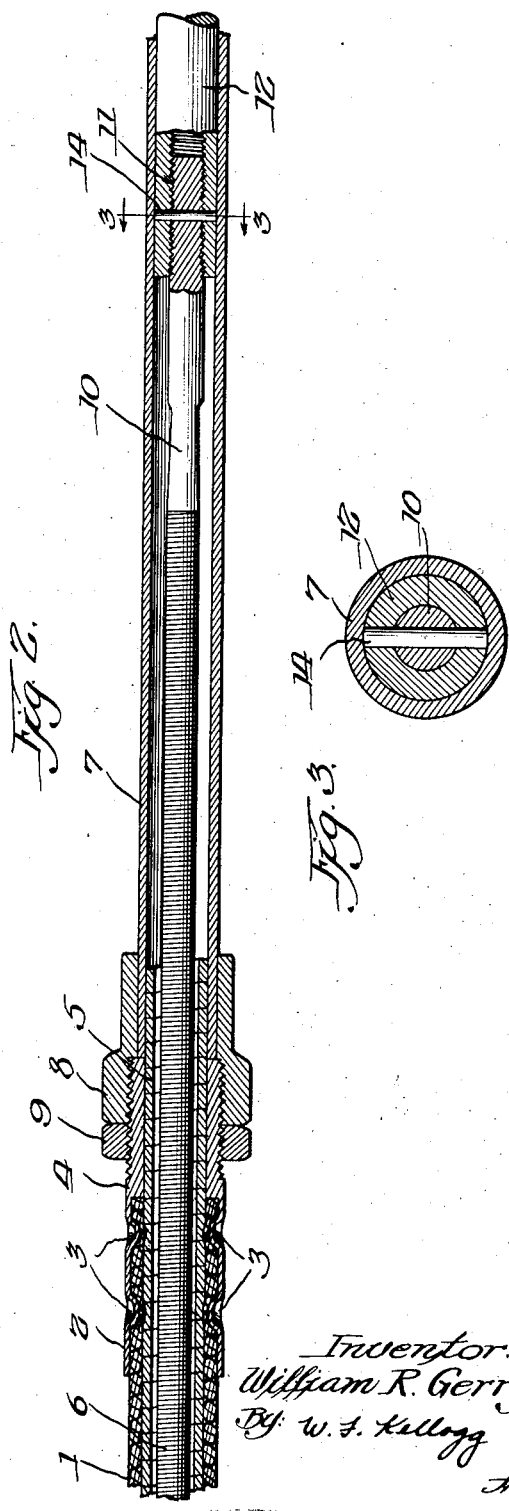
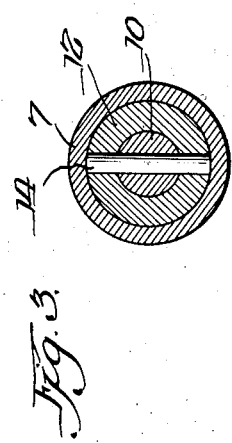
Inventor:
William R. Gerry:
By: W. F. Kellogg
Atty.

Patented Aug. 3, 1943

2,325,671

UNITED STATES PATENT OFFICE 2,325,671

CONTROL MECHANISM

William R. Gerry, Kalamazoo, Mich., assignor to Shakespeare Products Company, Kalamazoo, Mich., a corporation of Michigan Application November 18, 1941, Serial No. 419,606

4 Claims. (Cl. 74—501)

This invention relates to improvements in control mechanisms and has for an object to provide an advantageous and novel form of construction and assembly for flexible or other types of control mechanisms, whereby the motion transmitting member of the control mechanism, including the flexible element and its inflexible connecting element or shank can be, when desired or required, easily and freely removed from the casing member for inspection or other purposes and thereafter, operatively reengaged or replaced in the same.

Heretofore, it has been the practice to produce control mechanisms wherein the motion transmitting members and rods of such members are fixedly interconnected, and the controls completely assembled in the producing factory in a manner whereby the entire control is a unit. By reason of such construction and assembly, when, as is oftentimes required, it is desired to remove the inner element of the motion transmitting member for inspection, such member upon being removed from the control casing must be replaced by another. Such procedure is both impractical and costly.

The improved construction and assembly eliminates the above disadvantages and inconveniences in that the motion transmitting member (in its entirety) employed thereby can be rapidly and conveniently removed, inspected, and then replaced in the mechanism casing without, in any manner, affecting its subsequent operating efficiency.

Other objects of the invention will be in part obvious and in part pointed out hereinafter.

In order that the invention and its mode of operation may be readily understood by those skilled in the art to which it appertains, I have in the accompanying drawing and the detailed description based thereupon, set out one embodiment of my invention.

In the drawing:

Figure 1 is a side elevation of my improved control mechanism.

Figure 2 is an enlarged longitudinal section through the same, and

Figure 3 is a transverse section taken on the line 3—3 looking in the direction in which the arrows point.

Having more particular reference to the drawing, in connection with which like characters of reference will designate corresponding parts throughout, the improved construction comprises a flexible casing 1 of the desired length. Over one end of the casing 1 a coupling sleeve 2 is engaged and is secured to adjacent portions of the casing by any suitable means, as for example, by anchoring indentations generally indicated at 3. The outer end of the coupling sleeve 2 is provided with an externally screw threaded nipple or extension 4, the inside diameter of which is such as to snugly receive a tubular inner layer or sleeve 5 of the casing 1 therein, as shown in Figure 2 of the accompanying drawing.

A flexible movable member 6 is received in and through the casing 1 and, normally, extends for a distance beyond that end of the same provided with the screw threaded nipple 4, as is also shown in said Figure 2.

An elongated sleeve 7, fixedly carrying a sleeved nut 8 on one of its ends, is adapted to have engagement with the nipple provided end of the casing 1; the nut 8 being engaged with and over the externally screw threaded nipple 4 and adapted to be locked in such engaged or connected relationship by means of a jam or locking nut 9 also turned on to the screw threaded nipple 4 and into binding or locking engagement with the adjacent and shouldered portion of the nut 8 (see Figures 1 and 2).

It is to be here noted that the inside diameter of the elongated sleeve 7 is greater than that of the element 5 of the casing 1. In consequence, it will be observed upon reference to Figure 2 of the accompanying drawing, that a portion of said element will be snugly received within the adjacent end portion of the elongated sleeve 7.

A shank 10 has fixed engagement with the outer end of the movable member 6; its outer end portion being screw threaded and adapted to be screw threadedly engaged, as at 11, with the adjacent end of a rod or connecting rod 12, snugly and movably received within the outer end portion of the elongated sleeve 7. The free end of this movable rod 12 is suitably provided to facilitate its connection with apparatus or devices to be controlled or operated by the mechanism, as in the instance of the present embodiment, wherein said end of the rod is screw threaded as at 13 and, obviously, normally extends for a distance beyond the free end of the elongated sleeve 7. In order that the screw threadedly engaged inner end of the rod 12 will be locked in non-rotatable engagement with the shank 10, I may, and preferably do drill a hole through said rod and an appropriate portion of the shank 10, as shown in Figure 2, so that a connecting or locking pin 14 may be engaged therein and thus, prevent undesired or unwarranted disconnection or disengagement beyond the interconnected elements 10 and 12.

By reason of the fact that the inside diameter of the elongated sleeve 7 is greater than that of the element 5 of the casing 1, plus the fact that the rod 12 is also of greater diameter than the inside diameter of said element 5, it will be understood that sliding movement of the movable member 6 will be limited or interrupted when the inner end of said rod 12 is brought into abutting engagement with the adjacent end of the tubular element 5. When, however, it is desired to remove the movable member 6 from the casing 1, for inspection or other purposes, such operation may be conveniently and quickly effected by turning the nut 8 from the screw threaded nipple 4, and withdrawing the elongated sleeve 7 from the adjacent end portion of said movable member 6, the shank 10 and the rod 12. In this manner, the diametrically arranged locking pin 14 will be exposed, hence, permitting its removal from the elements 10 and 12; allowing the rod 12 to be turned or disengaged from the screw threaded end of the shank 10. With the rod 12 thus disengaged from the shank 10 of the movable element 6, it will be seen that said movable element, together with said shank 10, may be freely and readily withdrawn from or through the casing 1, particularly, since the diameters of the movable member 6 and its shank 10 are less than is the inside diameter of the tubular element 5 of the casing 1. When proper inspection or the like of the movable member 6 has been effected, it may be reintroduced into and through the casing 1; the rod 12 reengaged with the screw threaded end of the shank 10, locked in such connection by reinserting the locking pin 14 and the elongated sleeve 7 reengaged over the adjacent portions of the rod 12, the shank 10 and the movable member 6, so as to permit its screw threaded engagement with the aforesaid nipple 4. The nut 8 is then locked against undesired rotation by jamming or locking engagement of the nut 9 with the adjacent side or end of the nut 8, as heretofore described.

Manifestly, the construction shown is capable of further modification, and such modification as is within the scope of my claims, I consider within the spirit of my invention.

I claim:

1. A control mechanism, including a casing, a flexible movable member received therein, an inflexible shank connected to one end of said movable member having a cross-sectional size passable through said casing, a sleeve removably engaged with one end of the casing and normally over a portion of said movable member and said shank, the inner diameter of the sleeve being greater than that of the casing, and a rod snugly and slidably received in said sleeve detachably connected to said shank.

2. A control mechanism, including a casing, a flexible movable member received therein, an inflexible shank fixedly connected to one end of said member having a cross-sectional size receivable in and passable through said casing, a sleeve, a nut fixed to one end of said sleeve having engagement with the adjacent end portion of said casing, the inner diameter of said sleeve being greater than the inner diameter of said casing, and a rod snugly and slidably received in said sleeve and detachably connected to the adjacent end of said inflexible shank beyond the adjacent end of said casing.

3. A control mechanism, including a casing, a sleeve detachably engaged with one end of the casing, a movable flexible member received in said casing and normally extending into said sleeve, a rigid shank connected to the end of said movable member in said sleeve, the cross sectional size of said shank substantially corresponding throughout its length to that of the movable flexible member, and a rod snugly and slidably engaged in and extending beyond said sleeve and connected to the free end of said shank and having a cross sectional size greater than the casing interior.

4. A control mechanism, including a casing, a sleeve removably engaged with one end of the casing having an inner diameter greater than that of the casing, a flexible member slidably received in said casing and sleeve, a rigid shank connected to the end of said movable member in said sleeve, the entire cross sectional size of said shank being such as to permit its movement into and through said casing, and a rod of cross sectional size to permit its snug and slidable engagement in said sleeve but not into or through said casing detachably connected to the free end of said shank and extending from and beyond said sleeve.

WILLIAM R. GERRY.